United States Patent Office

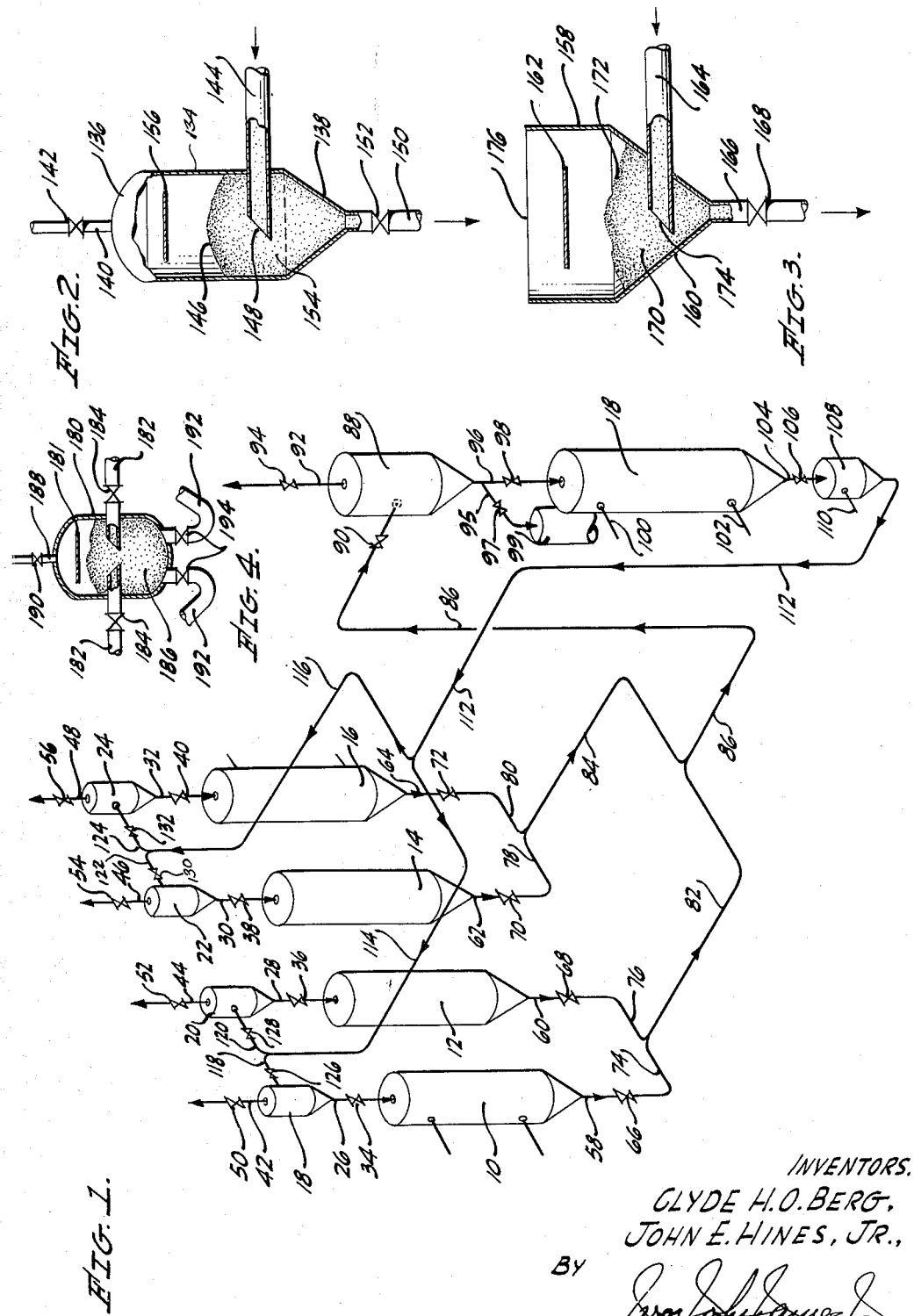

2,730,407
Patented Jan. 10, 1956

2,730,407
CONVEYANCE OF GRANULAR SOLIDS

Clyde H. O. Berg and John E. Hines, Jr., Long Beach, Calif., assignors to Union Oil Company of California, Los Angeles, Calif., a corporation of California Application October 23, 1950, Serial No. 191,566

22 Claims. (Cl. 302—17)

This invention relates to the conveyance of granular solids and in particular it relates to the distribution of solids to or the collection of solids from a plurality of points in a multiple path conveyor system wherein the granual solids move through a closed conduit by means of a concurrently depressuring conveyance fluid. Specifically this invention relates to an improved process and apparatus for the conveyance of granular solids wherein granular solids may be drawn at will from the conduit merely by opening a solids outlet valve.

In many industries the conveyance of granular solids in substantial quantities is involved. Some of the best known examples of such solids conveyance operations are the ore-treating industries such as the reduction of aluminum oxide to produce aluminum, the roasting of pulverized sulfide ore in multiple furnaces, various static and moving bed adsorption and catalytic conversion processes as well as many others. In the movement and storage of cereal grains large quantities of granular solids are transported over considerable distances from and into various storage bins. In adsorption operations including clay treating of lubricating oil, bone char clarification of sugar solutions, the deionization of aqueous fluids with granular ion exchange resins, certain static and moving bed adsorption processes in which gaseous mixtures are contacted with the adsorbent and separated, and in the numerous catalytic conversion processes, a plurality of treating vessels is employed to which granual solids must be supplied and from which they must be removed for disposal or reactivation. In many of these adsorptive or catalytic operations a multiplicity of catalyst or adsorbent vessels are employed through which a fluid to be treated is passed in contact with the granual solids which at the time may be in motion or stationary.

In all of the many operations exemplified above losses or misdistribution of the granular solids are undesirable and abrasion of mechanical equipment and attrition of the solids are to be avoided.

Conventionally such granular solids are conveyed by means of bucket elevators, closed or open drag lines, suspension gas lifts, and belt conveyors. Such pieces of equipment may be employed to distribute granular solids from a central source to a plurality of delivery points or to collect granular solids from a plurality of sources for delivery to a single delivery point.

The foregoing types of equipment have certain well known disadvantages which render them undesirable in some types of operation. Bucket elevators, drag lines, belt and other mechanical conveyors all involve moving parts which wear in contact with the granular solids, which must be lubricated, which are usually not operable under elevated pressures, and which are difficult to maintain at elevated temperatures. In suspension gas lift processes, large quantities of conveyance fluid per unit weight of granular solids conveyed are ordinarily required for operation and as the granular solids particles are free to move with respect to one another during conveyance and do so move at substantial velocities the granular solids attrition rate is higher than desirable. Besides the foregoing disadvantages, none is readily adaptable to distributing solids from a given source to a plurality of delivery points or from a plurality of sources to a single delivery point without employing a separate conveyor for each path or duplicating equipment over certain parts of the course of transmission.

The process and apparatus of the present invention overcome these disadvantages and provide a conveyor for the movement of granular solids in the manner described which is readily operable under pressure and at elevated temperatures, which is devoid of moving mechanical parts, which is capable of transferring unusually large quantities of granular solids for a given power consumption, and which does not cause deterioration of the granular solids by attrition or of the conveyance equipment due to abrasion.

It is therefore a primary object of the present invention to provide an improved process for conveying granular solids between a single point and a multiplicity of points through a branched conveyance zone wherein the granular solids are maintained in substantially compact form.

Another object of the present invention is to provide a process for the conveyance of granular solids in a closed branched conveyance zone in the presence of a concurrently depressuring conveyance fluid and from which granular solids may be drawn by physical manipulations carried out at the discharge end of the conveyance zone.

An additional object of the present invention is to provide an improved conveyance process for granular solids wherein granular solids flow in substantially compact form from a main source to a plurality of delivery points through a branched conveyance zone wherein a pressure differential of depressuring conveyance fluid is continuously maintained and granular solids flow when granular solids are removed from the discharge opening of any particular branch of the conveyance system.

Another object of this invention and which is a modification of the foregoing objects is to provide a process for solids conveyance in a branch conveyance zone within which granular solids flow is initiated by first opening the discharge opening of any particular branch to conveyance fluid flow thereby lowering the discharge outlet pressure and subsequently by permitting granular solids to discharge from the outlet opening of the particular branch involved.

A further object of the present invention is to provide a branched conduit conveyance apparatus to accomplish the aforementioned objects.

Other objects and advantages of the present invention will become apparent to those skilled in the art as the description thereof proceeds.

Briefly, the present invention comprises a process and apparatus for conveyance of granular solids to or from a plurality of points via a branched conduit conveyance zone comprising a header or main conduit and a plurality of branch and subbranch conduits while maintaining the granular solids therein in substantially compact form. The granular solids are conveyed by means of a conveyance fluid depressuring through the porous substantially compact moving mass of granular solids. The entire branched conveyance zone is maintained full of granular solids in such form. The solids are maintained in such form and prevented from fluidizing in the system by establishing a restrictive force at each discharge opening in the branched conveyance system which tends to restrict granular solids flow but exerts substantially no restriction on the flow of the conveyance fluid. This restrictive force on the discharging solids may be established by disposing a plate or grid transversely across and spaced usually not more than one discharge opening diameter away from the outlet of the conduit or it may be established by maintaining a static bed of granular solids which submerges the discharge opening as will be subsequently described.

A conveyance force is established by depressuring a conveyance fluid at least through those branches of the conveyance zone through which granular solids flow is desired. Such a flow of fluid concurrently with the solids through the conveyance zone establishes a pressure differential which exerts a conveyance force in the direction of fluid flow. Before solids motion can be established, the pressure drop per unit length at all points in the conveyance zone through which solids flow is desired must exceed a certain critical value which depends upon the physical properties of the granular solids and the conveyance fluid as well as the geometric attitude of the conveyance system.

In the present specification the term "substantially compact form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64%[1]) and the greatest bulk density (about 41.5% greater) when uniformly packed with particle centers coinciding with the apexes of a tetrahedron (rhombohedral packing—pore volume 25.95%[1]). The bulk density of solids during conveyance according to this invention is intermediate between the bulk densities of solids uniformly packed according to the foregoing systems and is apparently a random mixture of several packing geometries. Similar density variations occur in packings of nonuniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

| | |
|---|---|
| Conduit height, feet | 27.25 |
| Conduit attitude | Vertical |
| Conduit diameter, inches: | |
|   Inlet | 3.068 |
|   Outlet | 4.000 |
| Conveyance fluid | Air |
| Solids mesh size | 4–10 |
| Solids flow rate, lb./hr | 4,500 |
| Solids vibrational bulk density, lb./cu. ft | 46.7 |

[1] Micromeritics, J. M. Dalla Valle (1943), p. 105.

Upon depressuring the conveyance fluid from the bottom of the conduit while preventing further introduction of solids thereinto, it was noted that the solids level dropped only 0.25 foot from the solids outlet at the top of the 27.25 foot line indicating an operating solids bulk density of 46.3 pounds per cubic foot during conveyance. This is approximately an 0.85% decrease from the static value and in most cases the decrease is less than 2%.

Thus the operational bulk density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density, determined as previously described, by the ratio of the volume of that portion of the conduit remaining full of solids to the total volume of the conduit.

If more convenient or as a check determination the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decrease this differential pressure while in the method of this invention increases in conveyance fluid flow rate through the compact solids increase the differential pressure markedly. This characteristic distinguishes the compact state of the granular solids flowing according to this invention from dense phase aerated suspensions of solids. For example in a 140 foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140 foot conduit conveying 82,200 pounds per hour of 12–30 mesh adsorbent carbon as a dilute suspension in air the pressure differential is 1.12 pounds per square inch and a 10% increase in the air input decreases the pressure differential to 0.99 pound per square inch. Similarly in aerated or so-called "fluidized" systems the pressure differential decreases with increase in gas velocity. Thus, it is seen that the magnitude of the pressure differential is on the order of 50 times greater in conveyance of compact solids than in dilute suspensions and in many cases is considerably greater. Furthermore this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\left(\frac{dp}{dl}\right)}{\rho_s \cos \theta}$$

(the terms of which are given elsewhere herein). Except in relatively rare cases when the operating bulk density is decreased by an amount approaching 20% of the vibrational bulk density $\rho_s$ due to packing rearrangements of the compact solids and the ratio thus determined may be as low as 0.8, the conveyance force ratio as thus calculated exceeds 1.0 for conveyance of substantially compact solids whereas in a conduit carrying an aerated suspension a considerably lower value of $$\left(\frac{dp}{dl}\right)$$

and a conveyance force ratio well below 1.0 based on the vibrational bulk density is found. Both compact and aerated solids may exist in the same conduit and is a desirable operation in such processes as contact coking wherein the solids increase the size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention, the granular solids are conveyed in substantially compact form by means of a concurrently depressuring conveyance fluid, if the operating bulk density is not more 20% less than the static vibrational bulk density, or if there is an increase in pressure differential with increase in fluid flow rate, or if the conveyance force ratio is greater than 1.0.

Each solid particle is continuously in direct contact with several other particles surrounding it and is not free to move relative to them differentiating those conveyance operations in which the solids are aerated, fluidized or otherwise suspended in a fluid and have operating bulk densities always considerably less than 80% of the vibrational or static bulk density.

According to the present invention a source of granular solids is provided with an outlet header or main conduit from which subheader conduits and branch conduits extend to various delivery points. The source and delivery vessels and all the interconnecting main and branch conduits are maintained full of compact granular solids while the conveyance fluid, liquid or gaseous, is introduced into the source vessel under pressure and is depressured through one, several, or all of the main and branch conduits to establish the conveyance force. Similarly such a branched conveyance system may be provided for collecting granular solids from a plurality of sources and for delivery to a single delivery point. Much of the same physical considerations are involved in regard to conveyance fluid depressuring and control. At the discharge openings separator chambers are provided whereby the conveyance fluid and conveyed solids are separated. A combination system involving a plurality of branch delivery conduits and a plurality of branch collecting conduits is of particular merit in solids handling. As subsequently described the combination of conveyance zone and separator chamber is adapted to cause the movement of granular solids into the separator chamber only when granular solids are permitted to flow, as by gravity through an open valved line, from the separator chamber.

In the modification where a single source and a plurality of delivery points are involved, there are two principal types of conveyance zone operation. In the first type, the single source of granular solids is maintained at an elevated pressure relative to the discharge openings. The conveyance fluid is permitted to flow through the header and subheader conduits and out through all branches of the conveyance zone with granular solids flow being prevented by closing the solids outlet from the various separator chambers. A conveyance force is maintained at all points in the conveyance system sufficient to move the granular solids. By opening the solids outlet from any given separator chamber the solids level in the separator chamber decreases permitting solids flow through its associated branch conduit whereby solids flow through that branch proceeds only so long as solids are permitted to flow from the chamber.

In another type the conveyance fluid outlet from the separator chamber is also closed and thereby the pressure of conveyance fluid existing therein rises to its highest possible value (determined by the pressure existing at the point of joining with a subheader) so that no pressure differential exists across the particular branch of the conveyance zone. To obtain a solids flow at that particular delivery point the conveyance fluid outlet is opened to depressure the separator chamber and establish a conveyance force throughout the branch. Once the design discharge pressure is attained and the conveyance force established, the granular solids outlet from the chamber is opened to initiate solids delivery which simultaneously starts solids flow in the particular conveyance zone branch. In the apparatus according to the present invention, a separator chamber is provided at the discharge opening of each branch conduit where plural delivery points are established and a single separator chamber is provided where plural sources and a single delivery point are employed.

In the present invention the granular solids situated in the conveyance conduit are maintained in substantially compact form, the granular solids moving as a continuous solids mass through the line with the only gas space present being that existing in the voids of the compacted granules. A conveyance fluid, which may be either liquid or gaseous, is depressured concurrently through the interstices of the granular solids thereby creating a pressure drop distributed along the length of the conveyance conduit. For a given quantity of conveyance fluid the pressure drop per unit length of conveyance zone is directly proportional to the permeability (as defined by Darcy's law of fluid flow through permeable solids) of the compact mass. This means that a lower pressure drop per unit length is manifest with flow through larger particle sizes than through a mass consisting of smaller particles. Analogously a greater quantity of conveyance fluid is required to establish a certain minimum required pressure drop per unit length for conveyance of relatively large-grained particles than is required with relatively small-grained particles.

The pressure drop of the conveyance fluid passing as described through the granular solids in the conveyance zone creates a conveying force in the direction of flow of the conveyance fluid. In conveyance conduits which rise this conveying force is counteracted by forces of gravity and when the solids are in motion it is further counteracted by forces of friction of the granular solids mass against the inner walls of the conveyance conduit. From such considerations it is determined that a certain minimum pressure drop per unit length is required to effect the movement of granular solids in this form and it is conveniently expressed as a ratio of the conveying force to the opposing force of gravity, and is termed the "conveyance force ratio." The conveyance force ratio is expressed as $$\frac{\left(\frac{dp}{dl}\right)}{\rho_s \cos \theta}$$

the characters in the equation being used with consistent units such as $$\left(\frac{dp}{dl}\right)$$

is the pressure drop of conveyance fluid per unit length of the conveyance zone in pounds per square foot per foot, $\rho_s$ is the bulk density of the granular solids in pounds per cubic foot, and $\theta$ is the angular deviation of the axis of the conveyance zone from the vertical. A sufficiently high conveyance fluid flow rate is maintained to generate within the conveyance zone a conveyance force ratio which exceeds 1.0. Minimum conveyance force ratios in the line during actual operation exceed this value somewhat since solids friction against the walls is not considered in the above relationship. In usual operation a minimum conveyance force ratio of between 1.01 and about 1.5 is sufficient to insure proper operation. However, maximum values of conveyance force ratio existing within the conveyance conduit may exceed this value.

As an example of the quantity of gas necessary to generate a sufficient conveyance force ratio to effect movement of the solids it has been found that in the conveyance of T. C. C. synthetic bead catalyst about 0.083 standard cubic foot of air per pound of catalyst is sufficient and that in the conveyance of granular charcoal having a mesh size of 12 to 30 about 0.0125 standard cubic foot of air is sufficient to convey a pound of charcoal in a vertical conduit 20 feet in height.

Granular solids may be conveyed through the various headers, subheaders and branch conduits of the present invention in all directions as well as conveyed around corners to change the flow direction. By restricting the solids discharge from the line and depressuring a conveyance fluid in the proper gradient therethrough without restricting the fluid discharge, granular solids may be conveyed in substantially compact form in any upward, horizontal, or downward direction.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but is also applicable though part of the conveyance path is along a direction outside this solid angle.

The parts of the branched conveyance zone may therefore proceed in several directions in proceeding from the solids source to the delivery point. For example, the line may proceed from the source horizontally for a certain distance, then rise vertically for a certain distance, then may branch into two or more branched conduits which in turn may proceed vertically, horizontally, or in other required directions including downward paths to the delivery point or points.

In those cases in which the outlet of a particular conduit branch is closed and no conveyance fluid is allowed to escape except when discharge of granular solids is contemplated, the conveyance fluid pressure in that particular line gradually rises to an equilibrium pressure throughout the length of that branch which is equal to the conveyance fluid pressure existing at the point of branching from the main or header conduit. For example, in a conveyance of granular charcoal a single source is maintained at 50 pounds per square inch gauge pressure, a main header conduit proceeds from the source and divides into three identical branched conduits, and the discharge outlet of each branch is designed to operate at a pressure equal to that of the atmosphere. When one branch is discharging granular charcoal and the other two branches are closed to solids and conveyance fluid flow, the latter two closed branches attain an equilibrium pressure throughout of 35 pounds per square inch gauge which is the operating conveyance fluid pressure in the header conduit at the point of branching. Thus when one of the closed branches is desired to be placed in operation, conveyance fluid flow is initiated by depressuring the separating chamber from 35 pounds per square inch to zero pounds per square inch gauge thus establishing the conveyance force and solids flow may be initiated by opening the solids outlet valve.

The apparatus and process of the present invention may be more clearly understood by reference to the accompanying drawings in which:

Figure 1 shows a schematic diagram of an apparatus employing the features of the present invention as applied to conveyance of solids from a single source to four delivery points and to the collection of granular solids from four sources for conveyance to a single delivery point, Figure 2 shows an elevation view in cross section of the closed or pressure operated type separating chamber according to the present invention, Figure 3 is an elevation view in cross section of an open or atmospheric pressure type separating chamber, and Figure 4 shows an elevation view in cross section of a vessel employed at the points of conduit division in the branched conveyance system of this invention.

A representative apparatus embodying the principles of this invention is provided in which granular solids pass from a primary solids zone to a primary induction zone, are conveyed in compact form from the primary solids zone or the primary induction zone successively through a primary main conveyance zone, a plurality of primary branch conveyance zones, and sometimes a further plurality of primary subbranch conveyance zones into a plurality of primary separator zones. From each of these latter zones the solids are delivered into a plurality of secondary solids zones for desired treatment, storage, or other use. The solids then pass from the secondary solids zones into a plurality of optional secondary induction zones from which they are conveyed in compact form successively through a plurality of secondary subbranch conveyance zones, a plurality of secondary branch conveyance zones and a secondary main conveyance zone into a secondary separator zone. Therefrom the solids pass into a tertiary solids zone or into the primary solids zone. In the latter case a recirculatory system is established as shown in Figure 1.

Referring now particularly to Figure 1, the apparatus of the present invention is provided with a plurality of secondary zones in the form of four contacting vessels 10, 12, 14 and 16. Within each of these vessels is maintained a compact bed of granular contacting material such as adsorbent, catalyst, ion exchange resin or other contacting material. Conventional inlets and outlets for the fluid to be contacted are provided to and from each vessel. In such a system one of the vessels is not operated at any given time and the contacting material is conveyed to the regeneration vessel 18 for reactivation. During this time fluids are contacted with the granular solids in the remaining vessels.

Vessels 10, 12, 14 and 16 are provided, respectively, with a plurality of primary separation zones in the form of separator chambers 18, 20, 22 and 24 into each of which a branch of the branched conveyance apparatus of the present invention discharges and details of which are shown in Figures 2 and 3. The granular solids discharging into any of the separating chambers are withdrawn by means of lines 26, 28, 30 and 32, respectively, at rates which are controlled by valves 34, 36, 38 and 40, respectively, for passage into the plurality of secondary zones, i. e., contacting vessels 10, 12, 14 and 16, respectively. Lines 42, 44, 46 and 48, respectively, in turn controlled by valves 50, 52, 54 and 56, respectively, are provided for the removal of conveyance fluid from each separating chamber. When atmospheric pressure separating chambers are employed and compressed air or water for example is employed as the conveyance fluid, the latter is merely allowed to escape without restriction from the separating chamber. When liquid conveyance fluids are employed, the outlet lines 42, 44, 46 and 48 are provided for removal of depressured liquid. When pressure separating chambers are employed these conveyance fluid outlets may be joined for recycling depressured fluid to the pressuring device employed for introducing the fluid under pressure into the solids induction zone of the source thus conserving conveyance fluid.

When granular solids are to be withdrawn from any or all of the plurality of secondary solids zones, i. e. contacting vessels 10, 12, 14 or 16, via lines 58, 60, 62 or 64 respectively, the appropriate granular solids outlet valve 66, 68, 70 or 72 is opened while the corresponding solids inlet valve 34, 36, 38, or 40 to that particular vessel is kept closed. A conveyance fluid is then introduced through an inlet located near the top of the vessel to be emptied and depressured along with the compact granular solids from the vessel through its solids discharge line and through the corresponding subsecondary branch conveyance zone 74, 76, 78 or 80 and subsequently through either of secondary branch conveyance zone 82 or 84 and then through secondary main conveyance zone 86 into hopper or secondary separator zone 88 controlled by valve 90. Optionally, a plurality of secondary induction zones may be provided to receive and subsequently convey solids from the plurality of secondary solids zones. The granular solids flow in compact form concurrently with the depressuring conveyance fluid through the aforementioned conveyance zones. Depressured conveyance fluid is removed from secondary separator zone 88 via line 92 controlled by valve 94. Granular solids are discharged when desired into primary solids zone 18 which may be a solids regenerator via line 96 controlled by valve 98 in the recirculatory system referred to previously. In another non-recirculating system the solids from secondary separator zone are passed via line 95 controlled by valve 97 into a tertiary solids zone 99 also referred to above.

The spent granular solids may be completely transferred from any of the four contacting vessels shown into the tertiary zone 99 or to primary solids zone 18 wherein they may be regenerated or otherwise treated or used in a single operation as a static bed. In another modification the granular solids charge from any of the secondary zones is transferred to secondary separator zone 88 from which the spent solids are passed as a continuous moving bed through primary zone 18 at a rate controlled by valve 106 and the treated solids collect in induction zone 108. Inlet and outlet 100 and 102 are provided in primary zone 18 for the introduction and removal of regeneration or other solids treating fluids. Means not shown are provided in primary zone 18 for heating the spent solids for example as in the regeneration of carbon adsorbents in the presence of steam. In some cases of solids treatment, they may be cooled if removal of exothermic heat of treatment is required.

Granular solids are discharged from primary solids zone 18 via line 104 controlled by valve 106 and accumulate in primary induction zone 108. Inlet 110 is provided for the introduction of conveyance fluid under pressure into zone 108 for conveyance of solids therefrom.

Primary main conveyance zone 112 for regenerated solids is provided leading from induction zone 108 and through which a compact mass of regenerated granular solids flows for return to any one of the plurality of secondary solids zones. Secondary main conveyance zone 112 is subsequently divided into secondary branch conveyance zones 114 and 116 which feed, respectively, the two pairs of secondary solids zones 10 and 12, and 14 and 16. The two zones 114 and 116 subsequently divide into secondary subbranch conveyance zones 118, 120, 122 and 124 provided respectively with valves 126, 128, 130 and 132 and introduce granular solids when desired, respectively, into secondary separator zones 18, 20, 22 and 24 from which they discharge into their associated treating vessels.

The granular solids flow in the main, branch and subbranch conveyance zones may be either continuous or intermittent and in particular the solids conveyance system described is applicable to the removal or introduction of granular solids from or to a single vessel situated in a system involving a plurality of vessels or to transferal of solids from a lesser number of vessels to a greater number thereof.

Referring now more particularly to Figure 2 a pressure separating chamber is shown fabricated of cylindrical section 134 provided with dished or hemispheric head 136 and conical bottom 138. Line 140 controlled by valve 142 is provided for the removal of conveyance fluid. Solids inlet line 144 which is a branch conduit of the conveyance zone is introduced into the lower portion of cylindrical section 136 horizontally or any other required direction. The granular solids level 146 rises to the position shown thereby submerging outlet opening 148 of line 144 with granular solids. Solids outlet line 150 controlled by valve 152 is provided at the bottom of the separator chamber for the withdrawal of granular solids.

Upon depressuring the conveyance fluid from the separator chamber and establishing a conveyance fluid flow thereinto via line 144 no granular solids flow through line 144 because of the depth of solids existing between solids level 146 and outlet 148. The conveyance fluid passes upwardly through level 146 and is removed from the chamber via line 140. Upon opening valve 152, granular solids flow via line 150 from solids accumulation 154 causing level 146 to drop which decreases restrictive force against the solids in line 144 and permits the depressuring conveyance fluid to introduce granular solids into the separator chamber and solids flow occurs. A baffle 156 is preferably provided in the upper portion of cylindrical section 134 to inhibit granular solids from passing through line 140 during upset conditions.

Referring now more particularly to Figure 3, a separator chamber designed to operate at atmospheric pressure or to be operated enclosed in another pressure vessel is shown. This modification consists of cylindrical section 158 provided with a lower conical section 160 attached thereto. Baffle plate 162 is provided to perform a function analogous to that of baffle plate 156 in Figure 2. Granular solids inlet 164 to the lower portion of cylindrical section 158 is provided. Granular solids outlet line 166 controlled by valve 168 is provided for the withdrawal of granular solids from the separator. Solids accumulation 170 is formed having solids level 172 and which submerges solids inlet line discharge opening 174. The height of granular solids level 172 above discharge opening 174 attains a value sufficient to prevent granular solids flow from line 164 into accumulation 170. The exposed cross sectional area for conveyance fluid disengagement in solids level 172 is designed to be sufficiently high so that no entrainment of granular solids in disengaging conveyance fluid results. The same is true in the design of the separator chamber shown in Figure 2. In the present modification conveyance fluid escapes continuously through solids level 172 and from the top opening 176 of the separator chamber. When granular solids are to be delivered, solids flow control valve 168 is opened causing solids level 172 to drop decreasing the restrictive force on the granular solids and causing granular solids to be discharged from branch conduit 164 into accumulation 170. In such a modification when a plurality of branch conduits is employed, one or more of the subheader conduits as well as one or more of the branch conduits operate as sealing legs with conveyance fluid depressuring continuously through a conduit packed with compact unmoving granular solids. Usually granular solids flow in only one of the subheaders and branch conduits is maintained at any given time, but several or all of the lines may discharge solids simultaneously if required.

Referring now more particularly to Figure 4, a special apparatus is shown for flowing compact solids according to this invention from one number of conveyance conduits into another number, either greater or fewer, of conduits and in which solids attrition is practically eliminated. In the apparatus solids vessel 180 is provided with baffle plate 181 and solids inlet conduits 182 controlled by valves 184, their outlets being submerged in a mass of solids 186. A fluid outlet 188 controlled by valve 190 is also provided which is kept closed in most operations, but through which fluid is removed when an excess exists over that required to convey solids from the vessel or added when there is a deficiency. Solids in substantially compact form are introduced via lines 182 and are removed via lines 192 controlled by valves 194. When this device is used to diverge solids flow from a main conduit into a plurality of branch conduits, a single inlet conduit 182 and a plurality of outlet conduits 192 are provided and operated. When convergence of solids streams is desired, a plurality of inlet conduits 182 and a single outlet conduit 192 are provided and operated. In some operations the divergence is from a fewer to a greater number of conduits and in others the convergence is from a greater number to a fewer number. The solids loss by attrition in these operations and apparatus abrasion is materially reduced relative to that encountered when the various conduits open directly into each other.

With reference to the foregoing description of Figure 1 it is to be understood that the disclosure of process and apparatus involving a single main header, two subheaders and four branch conduits is merely an example and not intended to limit the present invention to such a modification. Any number of branches may be employed and it is preferable, though not absolutely necessary, that the length and diameter of each of the subheaders be the same and that the length and diameter of all the branch conduits be the same. This is desirable since the pressure drop between the source and any given delivery point will, under such conditions, be approximately the same or when the pressure of the source is established and the pressure of the separator chambers is that of the atmosphere, the flow rate of granular solids and of conveyance fluid will be substantially the same at all of the discharge openings or delivery points. As above stated, this is convenient for smooth industrial operation but not absolutely essential.

In the plural solids delivery system of this invention a variation in the conduit design is employed depending on whether only one or several of the branch conduits are to be operated simultaneously. When flow through a single branch only is to be effected, the cross sectional area of the entrance to that branch is preferably the same as that of the header or subheader at the point from which the branches extend. When simultaneous flow through two branches is desired, the entrance area of each branch is ½ the area of the header at the branch point when "$n$" branches are to simultaneously deliver solids, the entrance area is "$1/n$th" of the header area. When solids flow is to be intermittent in the "$n$" branches but the conveyance fluid flow is continuous, the entrance area of each branch is substantially "$1/n$th" of that of the header conduit at the branching point.

The design and operation of the conveyance process and apparatus according to this invention is shown in the following examples:

Example I

The following data are for the operation of a conveyance apparatus having two delivery branches to intermittently deliver solids and in which a continuous conveyance fluid flow is permitted. The granular solids are 4–10 mesh catalyst granules and are to be transported 14 feet through a header conduit and then 14 feet through either one of two branch conduits. The conveyance fluid is air.

The header conduit is tapered from 4.25 inches I. D. to 4.95 inches I. D. in a length of 14 feet. The branch conduits are similarly tapered from 3.5 inches I. D. to 4.0 inches I. D. at the delivery point. For a solids delivery rate of 4,500 pounds per hour, conveyance fluid is introduced into the induction zone at a rate of 2192 S. C. F. H. (standard cubic feet per hour) and at 14.6 p. s. i. ga. (pounds per square inch gage). The pressure at the branching point is 7.5 p. s. i. ga. and that at each separator zone or delivery point is 0 p. s. i. ga. The conveyance fluid flow rate in the branch delivering solids is 1152 S. C. F. H. while that in the other branch, which acts as a sealing leg, is 1002 S. C. F. H. The remainder of the fluid introduced remains in the induction zone to displace solids therefrom. The cross sectional area at the entrance of each branch was identical and equal to approximately 50% of that of the main conduit at the point of branching.

Example II

In the same apparatus as above described in Example I, solids are discharged simultaneously from both branch conduits at 4500 pounds per hour each. The conveyance fluid flow rate in each branch is 1152 S. C. F. H. of which 1002 S. C. F. H. flows from the top of each separator chamber and 150 S. C. F. H. is removed from each separator in the void spaces of the solids. The total conveyance fluid input to the induction zone is 2304 S. C. F. H. at a pressure 14.6 p. s. i. ga. The outlet pressure is 0 p. s. i. ga.

Example III

In another operation of a two-branched conveyance system according to this invention, granular solids are delivered from each branch separately and intermittently and the nondelivering branch is completely closed to conserve conveyance fluid. The total quantity of conveyance fluid required is considerably reduced. The 14 foot header section varies in diameter from 3.04 inches I. D. to 3.50 inches I. D. The two branch conduits are 14 feet long and are the same diameters as in Examples I and II. The conveyance fluid is introduced into the induction zone at a rate of 1190 S. C. F. H. and the fluid flow in the header and the opertaing branch conduit is 1152 S. C. F. H. for a solids delivery rate of 4,500 pounds per hour. The header conduit inlet pressure is 14.6 p. s. i. ga., the outlet pressure 0 p. s. i. ga., and the pressure of the branch point and entire length of the non-delivering branch was 7.5 p. s. i. ga. By closing the solids outlet and then the fluid outlet on the operating separator solids flow stops. By depressuring the separator of the nonoperating branch from 7.5 p. s. i. ga. to 0 p. s. i. ga. and opening the solids outlet, solids flow starts in the previously quiet line.

Thus in Example I wherein alternate delivery is made from a two-branch conduit, the cross sectional area of the entrance of each branch is one-half that of the header conduit outlet. In Example II wherein simultaneous delivery is made from both branches substantially the same area relations are maintained. In Example III wherein only one branch delivers while the other branch is closed to solids and fluid flow, the entrance area to each branch is substantially the same as the outlet area of the header conduit.

Example IV

The following specifications are for a multiple inlet conveyance system according to this invention in which two inlets deliver solids at a rate of 4500 pounds per hour to a single delivery point. The branch inlet conduits are 14 feet long, each tapering from 4.25 inches to 4.95 inches I. D. The conveyance fluid rate into the induction zone provided at the inlet of each branch is 2192 S. C. F. H. and at 14.6 p. s. i. ga. The pressure at the inlet of the header conduit is 7.5 p. s. i. ga. The conveyance fluid flow through each branch conduit is 2134 S. C. F. H. and through the single header is 4268 S. C. F. H. The header conduit is 14 feet long and tapers from 7.0 inches to 8.1 inches I. D. The delivery pressure is 0 p. s. i. ga. and the conveyance fluid flow from the separator is 3968 S. C. F. H. while 300 S. C. F. H. are removed in the void spaces of the 9000 pounds per hour delivered.

Example V

A multiple inlet system like that of Example IV but modified for alternate branch inlet conduit delivery has the following characteristics. The two branch inlets are the same as in Example IV but the single delivery or header conduit is tapered from 4.95 inches to 5.72 inches I. D. The solids delivery rate is 4500 pounds per hour requiring 2134 S. C. F. H. of conveyance fluid. The pressure throughout the nonoperating branch conduit rises to about 7.5 p. s. i. ga.

Example VI

In a system for conveyance of 10–20 mesh granular adsorbent for clarification of liquids, a single header conduit of uniform 8.5 inches I. D. conveys the compact solids at a rate of 12,000 pounds per hour. This header feeds two branch delivery conduits of uniform 6.0 inches I. D. which simultaneously deliver 6,000 pounds per hour of solids to the contact vessels. The conveyance fluand is water depressured through the conduits. The header and branch conduits are both 20 feet in length.

Thus in Examples IV and V the principles of the present invention are applied to a multiple inlet single outlet conveyance system while in Example VI the use of liquid conveyance fluids is illustrated. In Examples I–V the material transferred is 4–10 mesh granular catalyst and the conveyance fluid is compressed air. It is not intended to limit this invention to such sized solids since larger and smaller sizes such as from 200 or 300 mesh to 2 to 4 inch or larger lumps may be transferred. Similarly, liquid conveyance fluids may be substituted where it is more convenient.

It should not be understood that the conveyance systems herein described are limited to those having two inlet or delivery branches since three, four, five or more such branches may be employed using the principles of design and operation of this invention given above.

In each of the foregoing example systems, junction vessels or junction zones as shown in Figure 4 may be employed at all points of convergence or divergance of the conveyance apparatus.

Gaseous or liquid conveyance fluids may be employed with the only modification being that conduits of substantially constant cross sectional area are used with liquid conveyance fluids, Liquids such as water, liquid hydrocarbons, molten metals or salts and others may be employed.

The above description of the invention is not to be taken as limiting since modifications may be made by those skilled in the art without departing from the spirit and scope of the following claims.

We claim:

1. A process for the transfer of granular solids from at least one primary solids zone to and from a plurality of secondary solids zones which comprises passing granular solids from said primary solids zone successively through a primary main conveyance zone and through at least one of a plurality of divergent primary branch conveyance zones communicating therewith into at least one of said plurality of secondary solids zones, subsequently passing granular solids from at least one of said plurality of secondary solids zones successively through a communicating one of a plurality of converging secondary branch conveyance zones and through a secondary main conveyance zone communicating therewith, restricting the discharge of granular solids from said plurality of primary branch conveyance zones and from said secondary main conveyance zone to maintain the granular solids in all flowing conveyance zones at substantially their static bulk density, and depressuring a conveyance fluid concurrently with the granular solids through the flowing conveyance zones at a rate of flow sufficient to establish a conveyance force ratio which is greater than 1.0.

2. A process according to claim 1 in combination with the step of discharging granular solids from said secondary main conveyance zone into a tertiary solids zone.

3. A process according to claim 1 in combination with the step of discharging granular solids from said secondary main conveyance zone into said primary solids zone and recirculating granular solids successively through said primary solids zone and said plurality of secondary solids zones.

4. A process for the transfer of granular solids from a primary solids zone to and from a plurality of secondary solids zones which comprises depressuring a conveyance fluid concurrently with a moving compact granular solids stream from said primary solids zone successively through a primary main conveyance zone and then as separate diverging streams through a plurality of diverging primary branch conveyance zones communicating therewith and then into said plurality of secondary solids zones, restricting the discharge of solids from each of said primary branch conveyance zones to maintain said solids flowing in said primary main conveyance zone and said diverging primary branch conveyance zones as a continuous mass having a bulk density substantially equal to the static bulk density of said solids when at rest, depressuring a plurality of separate conveyance fluid streams concurrently with solids removed from said secondary solids zones successively through a plurality of converging secondary branch conveyance zones communicating each of said secondary solids zones with a secondary main conveyance zone and then through said secondary main conveyance zone to a delivery point, restricting the discharge of granular solids from said secondary main conveyance zone to maintain the solids flowing in the converging secondary branch conveyance zones and said secondary conveyance zone as a continuous mass having a bulk density substantially equal to the static bulk density of said solids when at rest, and controlling the flow of said depressuring conveyance fluid at a rate sufficient to maintain a conveyance force ratio greater than 1.0 within said conveyance zones whereby said solids are conveyed as a continuous compact granular stream from said primary solids zone and diverges into a plurality of such granular streams into said secondary solids zones and said solids are conveyed as a plurality of such granular streams from said secondary solids zone converging into a single such granular stream.

5. A process for the transfer of granular solids from at least one primary solids zone to and from a plurality of secondary solids zones which comprises passing granular solids from said primary solids zone to a primary induction zone, introducing thereinto a conveyance fluid under pressure, depressuring said conveyance fluid therefrom concurrently with said granular solids successively through a primary main conveyance zone and through at least one of a plurality of diverging primary branch conveyance zones into at least one of said plurality of secondary solids zones by removal of depressured conveyance fluid therefrom, subsequently passing granular solids from at least one of said plurality of secondary solids zones into a communicating one of a plurality of secondary induction zones, introducing a conveyance fluid under pressure thereinto, depressuring said conveyance fluid concurrently with a moving mass of granular solids therefrom through a communicating one of a plurality of converging secondary branch conveyance zones into and through a secondary main conveyance zone by removal of depressured conveyance fluid therefrom, restricting the discharge of granular solids from said plurality of primary branch conveyance zones and from said secondary main conveyance zone to maintain the granular solids in all flowing conveyance zones at substantially their static bulk density, and controlling the quantity of conveyance fluid flow in all flowing conveyance zones at a value sufficient to establish a conveyance force ratio therein which exceeds 1.0.

6. A process for the transfer of granular solids through at least one primary solids zone to and from a plurality of secondary solids zones which comprises passing granular solids from a primary solids zone into a primary induction zone, introducing a conveyance fluid under pressure thereinto, depressuring said conveyance fluid concurrently with said granular solids therefrom successively through a primary main conveyance zone and through a plurality of primary branch conveyance zones respectively into a plurality of communicating primary separator zones, removing depressured conveyance fluid therefrom, passing conveyed granular solids therefrom respectively into a communicating one of said plurality of said secondary solids zones, passing said granular solids from each of said plurality of secondary solids zones into a plurality of communicating secondary induction zones respectively, introducing a conveyance fluid under pressure thereinto, depressuring said conveyance fluid concurrently with granular solids therefrom successively through a communicating one of a plurality of converging secondary branch conveyance zones and then through a secondary main conveyance zone into a secondary separator zone, removing depressured conveyance fluid therefrom, removing conveyed granular solids therefrom, restricting the discharge of granular solids into each of said primary separator zones and the discharge of granular solids into said secondary separator zone to maintain the granular solids in all flowing conveyance zones at substantially the static bulk density, and controlling the rate of depressuring of said conveyance fluid to establish a conveyance force ratio in all flowing conveyance zones which exceeds 1.0.

7. A process according to claim 6 in combination with the step of maintaining a flow of depressuring conveyance fluid in only those ones of said plurality of primary branch conveyance zones through which granular solids flow is maintained, and preventing a flow of depressuring conveyance fluid through the remaining one of said plurality of primary branch conveyance zones by terminating the removal of depressured conveyance fluid from those primary separator zones communicating with the latter primary branch conveyance zones.

8. A process for the transfer of granular solids from one primary solids zone to and from a plurality of four secondary solids zones which comprises flowing granular solids from said primary solids zone into a primary induction zone, introducing a conveyance fluid under pressure thereinto, passing said solids and said conveyance fluid therefrom concurrently successively through a primary main conveyance zone and then in diverging streams through a plurality of four primary subbranch conveyance zones each communicating at its outlet end with a primary separator zone, removing depressured conveyance fluid from each of said primary separator zones, passing conveyed solids therefrom into four secondary solids zones communicating respectively therewith, passing said granular solids from each said secondary solids zones respectively into a secondary induction zone communicating therewith, introducing a conveyance fluid under pressure into each of said four secondary induction zones, flowing said conveyance fluid and said granular solids therefrom respectively and successively through four converging secondary subbranch conveyance zones and through a secondary main conveyance zone into a secondary separator zone, removing depressured conveyance fluid therefrom, flowing conveyed granular solids therefrom into said primary solids zone, restricting the flow of granular solids discharging from said secondary main conveyance zone and the discharge of granular solids from said four diverging primary subbranch conveyance zones to maintain the granular solids at substantially the static bulk density in all conveyance zones through which granular solids flow, and controlling the rate of flow of said conveyance fluid to maintain a conveyance force ratio greater than 1.0 therein.

9. A process for the transfer of granular solids from at least one primary solids zone to a plurality of secondary solids zones which comprises passing granular solids and a conveyance fluid concurrently from said primary solids zone successively through a primary main conveyance zone and through a plurality of diverging primary branch conveyance zones respectively into said plurality of secondary solids zones, controlling the flow of said conveyance fluid at a rate sufficient to establish a conveyance force ratio within said conveyance zones which exceeds a value of 1.0, and restricting the discharge of granular solids from said plurality of primary branch conveyance zones to maintain the granular solids in all flowing conveyance zones as a continuous moving mass having a bulk density substantially equal to the static bulk density of said solids when at rest.

10. A process for the transfer of granular solids from a plurality of secondary solids zones to a fewer number of primary solids zones which comprises passing granular solids from said plurality of secondary solids zones through a communicating plurality of converging secondary branch conveyance zones and through a secondary main conveyance zone concurrently with a flow of depressuring conveyance fluid, restricting the discharge of granular solids from said secondary main conveyance zone to maintain the granular solids in all flowing conveyance zones substantially at their static bulk density, controlling the flow of said conveyance fluid at least through the flowing conveyance zones at a rate sufficient to establish a conveyance force ratio which is greater than 1.0.

11. A process for the transfer of granular solids from a plurality of secondary solids zones to a fewer number of primary solids zones which comprises passing granular solids from said secondary solids zones respectively into a plurality of communicating secondary induction zones, introducing a conveyance fluid under pressure thereinto, depressuring said conveyance fluid concurrently with said granular solids therefrom successively through a plurality of converging secondary branch conveyance zones which converge into a fewer number of secondary conveyance zones, discharging granular solids therefrom respectively into a fewer number of secondary separator zones, removing depressured conveyance fluid therefrom, passing granular solids therefrom respectively into said fewer number of communicating primary solids zones, restricting the discharge of granular solids into said secondary separator zone to maintain the granular solids in all flowing conveyance zones at substantially the static bulk density thereof, and controlling the rate of flow of the conveyance fluid to establish a conveyance force ratio in all flowing conveyance zones greater than 1.0.

12. An apparatus for the conveyance of granular solids from at least one primary solids chamber to and from a plurality of secondary solids chambers which comprises at least one primary solids chamber, a plurality of secondary solids chambers, a primary branched conveyance conduit consisting of a primary main conveyance conduit adapted at one end to receive granular solids from said primary solids chamber and communicating at the other end with the inlet openings of a plurality of divergent primary branch conveyance conduits each adapted to discharge granular solids at their outlet openings into one each of said plurality of secondary solids chambers, a secondary branched conveyance conduit consisting of a plurality of convergent secondary branch conveyance conduits each adapted at one end to receive granular solids from one of said plurality of secondary solids chambers and at the other end communicating with the inlet openings of a number of communicating secondary main conveyance conduits equal to the number of said primary solids chambers, means for restricting the discharge of granular solids from said secondary main conveyance conduit and from each of said plurality of primary branch conveyance conduits to maintain the granular solids flowing in each conveyance conduit substantially at their static bulk density, and means for depressuring a conveyance fluid concurrently with said granular solids through each flowing conveyance conduit.

13. An apparatus according to claim 12 wherein said means for restricting the discharge of granular solids from said conveyance conduits comprises a separator vessel adapted to contain a compact bed of granular solids partly filling said vessel, an outlet opening from the top of said vessel for depressured conveyance fluid, an outlet conduit from the bottom of said vessel for conveyed granular solids, and wherein said conveyance conduit discharging solids into said vessel opens through the side thereof and terminates in an outlet opening adapted to be submerged by said compact bed of solids therein and thereby restricting the solids discharge from said conveyance conduit.

14. An apparatus according to claim 12 in combination with a vessel disposed at each juncture of said main and branch conveyance conduits which comprises a pressure resistant vessel, at least one inlet conduit for granular solids opening into said vessel, and at least one outlet conduit for granular solids opening from said vessel.

15. An apparatus according to claim 12 in combination with a pressure resistant vessel disposed at the point of juncture of and opening into said main and branch conveyance conduits, the inlet conduits for granular solids opening into the side of said vessel and terminating therein in an outlet opening adapted to be submerged by a compact bed of granular solids contained therein, and the outlet conduits for granular solids therefrom opening from the bottom of said vessel.

16. An apparatus according to claim 15 wherein the pressure resistant vessel disposed at the juncture of said primary main and branch conduits is provided with at least one inlet conduit and a plurality of outlet conduits, said vessel being adapted to the divergence of a flow of compact granular solids.

17. An apparatus according to claim 15 wherein said pressure resistant vessel disposed at the juncture of said secondary branch and main conduits is provided with at least one outlet conveyance conduit opening from the bottom thereof and a greater number of inlet conveyance conduits opening into the side thereof, said vessel being adapted to the convergence of a plurality of streams of compact granular solids into a fewer number of streams of such solids.

18. An apparatus for the conveyance of granular solids from at least one primary solids chamber to and from a plurality of secondary solids chambers which comprises at least one primary solids chamber, a primary induction chamber in solids-receiving relation to said latter chamber, a plurality of secondary solids chambers in solids-receiving relation to a plurality of primary separator chambers, a primary main conveyance conduit adapted at one end to receive granular solids from said primary induction chamber and diverging at the other end into a plurality of primary branch conveyance conduits each adapted to discharge granular solids into one each of said plurality of primary separator chambers, a plurality of secondary induction chambers in solids-receiving relation to said plurality of secondary solids chambers, a plurality of secondary branch conveyance conduits each adapted at one end to receive granular solids from one of said plurality of secondary induction chambers and at the other end converging into a number of secondary main conveyance conduits equal to the number of said primary solids zones, separate means for restricting the discharge of granular solids from said secondary main conveyance conduit and from each of said plurality of primary branch conveyance conduits to maintain the granular solids flowing in each conveyance conduit at substantially their static bulk density, and means for depressuring a conveyance fluid concurrently with said granular solids through each flowing conveyance conduit.

19. An apparatus for the conveyance of granular solids from a primary solids chamber to a plurality of secondary solids chambers which comprises a primary solids chamber, a primary induction chamber in solids-receiving relation to said primary solids chamber, a plurality of secondary solids chambers in solids-receiving relation to a plurality of primary separator chambers, a primary main conveyance conduit adapted at one end to receive granular solids from said primary induction chamber and diverging at the other end into a plurality of primary branch conveyance conduits each adapted to discharge granular solids into one each of said plurality of primary separator chambers, means for restricting the discharge of granular solids from each of said plurality of primary branch conveyance conduits to maintain the granular solids flowing in each conveyance conduit at substantially their static bulk density, and means for depressuring a conveyance fluid concurrently with said granular solids through each flowing conveyance conduit.

20. An apparatus for the conveyance of granular solids from a plurality of secondary solids zones to a fewer number of primary solids zones which comprises at least one primary solids zone each in solids-receiving relation to a secondary separation zone, a plurality of secondary induction zones in solids-receiving relation to a plurality of secondary solids zones, a plurality of secondary branch conveyance conduits each adapted at one end to receive granular solids from one of said plurality of secondary induction chambers and at the other end converging into a number of secondary main conveyance conduits equal to the number of said primary solids zones, means for restricting the discharge of granular solids from each such secondary main conveyance conduit to maintain the granular solids flowing in each conveyance conduit at substantially their static bulk density, and means for depressuring a conveyance fluid concurrently with said granular solids through each flowing conveyance conduit.

21. An apparatus for the conveyance of granular solids and adapted to the divergence of at least one stream of granular solids flowing as a mass having substantially the solids' static bulk density concurrent with a conveyance fluid into a greater number of such streams which comprises a pressure resistant vessel provided with at least one solids inlet conveyance conduit opening into the side and below the top thereof and below the level of solids therein to restrict the discharge of solids from said solids inlet conduit and maintain said static bulk density, and a plurality of solids outlet conveyance conduits opening from the bottom of said vessel, at least one of said solids outlet conduits extending therefrom in a conveyance direction in which the solids will not flow by gravity alone.

22. An apparatus for the conveyance of granular solids and adapted to the convergence of a plurality of granular solids streams flowing as a mass having substantially the solids' static bulk density concurrently with a conveyance fluid into a fewer number of such streams which comprises a pressure resistant vessel provided with at least one solids outlet conveyance conduit opening from the bottom thereof, and extending therefrom in a conveyance direction in which the solids will not flow by gravity alone, and a plurality of inlet conveyance conduits opening into the side and below the top thereof and below the level of the bed of granular solids therein to restrict the discharge of solids from said inlet conduits and maintain said static bulk density.

References Cited in the file of this patent

UNITED STATES PATENTS

| 704,037 | Hooper | July 8, 1902 |
| 1,231,778 | Noll | July 3, 1917 |
| 1,256,017 | Hicks | Feb. 12, 1918 |
| 1,616,547 | Pontoppidan | Feb. 8, 1927 |

(Other references on following page)

UNITED STATES PATENTS

| | | |
|---|---|---|
| 1,898,356 | Fickey | Feb. 21, 1933 |
| 2,027,697 | Nielsen | Jan. 14, 1936 |
| 2,304,827 | Jewell | Dec. 15, 1942 |
| 2,316,814 | Schemm | Apr. 20, 1943 |
| 2,463,623 | Huff | Mar. 8, 1949 |
| 2,487,961 | Angell | Nov. 15, 1949 |
| 2,509,983 | Morrow | May 30, 1950 |

FOREIGN PATENTS

| | | |
|---|---|---|
| 180,397 | Great Britain | May 11, 1922 |
| 268,667 | Great Britain | Apr. 7, 1927 |